United States Patent [19]

Richardson

[11] 4,276,694

[45] Jul. 7, 1981

[54] FLUID LEVEL INDICATOR (VENT HOLES)

[75] Inventor: Mason E. Richardson, Clinton Township, Macomb County, Mich.

[73] Assignee: Van Products Company, Vanderbilt, Mich.

[21] Appl. No.: 76,759

[22] Filed: Sep. 18, 1979

[51] Int. Cl.³ .............................................. G01F 23/04
[52] U.S. Cl. .............................................. 33/126.7 R
[58] Field of Search .................... 33/126.7 R, 126.7 A, 33/126; 220/367

[56] References Cited

U.S. PATENT DOCUMENTS

| | | | |
|---|---|---|---|
| 3,991,476 | 11/1976 | Haines | 33/126.7 R |
| 4,067,113 | 1/1978 | Haines | 33/126.7 R |

FOREIGN PATENT DOCUMENTS 290409  5/1928  United Kingdom ............... 33/126.7 R Primary Examiner—Gerald Goldberg
Assistant Examiner—Denis E. Corr
Attorney, Agent, or Firm—Harness, Dickey & Pierce

[57] ABSTRACT

A dipstick assembly including a handle member having a passageway extending therethrough between the ends thereof, a measuring blade connected to the handle member and a cap member also having a passageway extending therethrough between the ends thereof and connected to the handle member in such a way as to allow ventilation of a sealed chamber when the dipstick assembly is disposed in an access passageway to the chamber. The cap member includes a sealing device for perfecting the seal between the dipstick assembly and the access passageway. Auxiliary venting ports allow ventilation of excess gases from the access passageway and the sealed chamber in the event that the open end of the passageway in the cap member is below the fluid level of the chamber.

8 Claims, 1 Drawing Figure

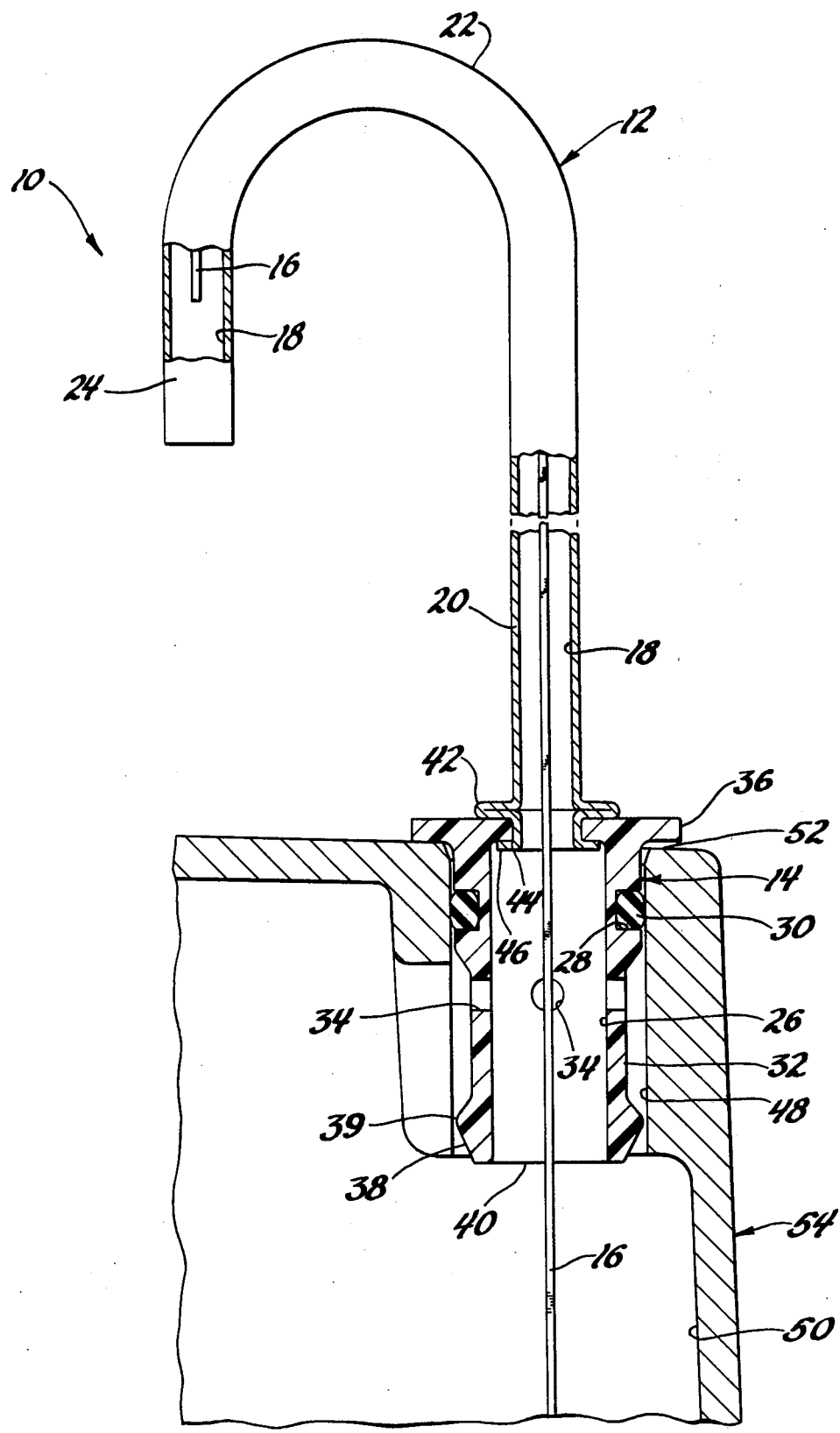

FLUID LEVEL INDICATOR (VENT HOLES)

BACKGROUND OF THE INVENTION

1. Field of the Invention

This invention relates to a dipstick assembly of the type which measures the fluid level within a sealed chamber such as a transmission or crankcase and ventilates excess gases from the chamber in which it is disposed.

2. Description of the Prior Art

Many adaptations of dipstick assemblies have been made to accommodate the reception of the assembly into an access passageway within a sealed vessel and to alleviate undesirable high pressure from within the vessel. Embodiments of dipstick assemblies have included ventilation passageways within the dipstick assembly comprised of a single opening exposed to the inside of the vessel to allow for venting. Depending on the positioning of the dipstick assembly within the chamber and the level of the contained fluid, the fluid level within the chamber can be above the open end of the dipstick assembly and therefore the ventilation passageway. In such a situation, an undesirable increase in gas pressure occurs in the chamber above the fluid level with resulting fluid flow out the venting passage and/or damage to the seals.

SUMMARY OF THE INVENTION

The subject invention relates to a dipstick assembly of the type used for measuring fluid levels within a sealed chamber. The dipstick assembly is adapted to be received within an access passageway. The dipstick assembly includes a handle member having a passageway extending throughout so as to allow communication therethrough, an elongated fluid indicating member attached to and extending from a first end of the handle member and a cap member also attached to the first end of the handle member and having an open end exposed to the inside of the sealed fluid chamber. The cap member includes a passageway for allowing ventilation of gases through the cap member and the attached handle member. Supported by the cap member is a sealing means for perfecting the seal between the cap member and the interior of the access passageway of the sealed fluid chamber when the dipstick assembly is inserted therein. The cap member also includes an auxiliary venting means for allowing ventilation of gases in the event that the open end of the cap member is below the fluid level within the chamber.

BRIEF DESCRIPTION OF THE DRAWING

Other advantages of the present invention will be readily appreciated as the same becomes better understood by reference to the following detailed description when considered in connection with the accompanying drawing which is an enlarged broken-away view partially in cross section showing the internal details of the dipstick assembly as it would appear engaged within an access passageway.

DESCRIPTION OF THE PREFERRED EMBODIMENT

Referring more particularly to the drawing, a dipstick assembly constructed in accordance with the instant invention is shown generally at 10. The dipstick assembly includes a handle member generally indicated at 12 which is tubular in form having a passageway 18 extending throughout. A cap member of tubular form is generally indicated at 14 and is attached to the end of a first straight portion 20 of the handle member 12 in such a way that a passageway 26 in the cap member 14 is in direct communication with the passageway 18 of the handle member 12 allowing ventilation of gases from within the sealed chamber 50. An elongated fluid level indicating blade 16 is attached to the handle member 12. The fluid level indicating blade 16 extends from the first straight portion 20 of the handle member 12 through the passageway 26 of the cap member 14 and into the fluid chamber 50.

The cap member 14 includes an outward flange 36 which forms an abutment means on the surface of the exterior portion 52 of the access passageway 48. In order to seal the access tube 48, the cap member includes a recessed annular groove 28 below the outward flange 56 and an annular sealing ring 30 disposed in the groove 28 sealingly engaging the cap member 14 to the access passageway 48. A section for auxiliary ventilation of gases through the cap member 14 is below the sealing ring 30 and includes a section of reduced diameter at 32. A plurality of ports 34 within the reduced diameter portion 32 of the cap member 14 result in communication between the interior passageway 26 of the cap member 14 and the access passageway 48, i.e., the chamber 50, through which excess gases are vented. Below the portion of reduced diameter 32 is a conical portion 38 forming the open end 40 of the cap member 14 which is in direct communication with the inside of the fluid chamber 50. In this preferred embodiment the conical portion allows easy access of the cap member generally indicated at 14 into the access passageway 18. The protrusions 39 of this section 38 would also stabilize the dipstick assembly within the access passageway 48.

The handle member 12 includes an arcuate portion 22 between a second straight portion 24 and the first straight portion 20; the first straight portion 20 being attached to the cap member 14. The first straight portion 20 of the handle member 12 includes a radially outward extending projection end 42 which abuts on the surface of an inwardly annular flange 44 of the cap member 14. Below the annular flange 44 is a second outwardly flared flange 46 integral with the handle member 12 which results in a mechanical attachment for securing the cap member 14 to the handle member 12.

The attachment of the fluid-level indicating blade 16 to the handle member 12 may be accomplished by any suitable manner. In the preferred embodiment indicated at 10, the attachment is accomplished by extending the blade 16 through the first straight portion 20 and through the arcuate portion 22 and, preferably, into the second straight portion 24. The bend in the blade 16 will prevent its removal under normal use conditions. Obviously, other means of attachment may be employed if desired without detracting from the concept of the instant invention.

In use, the cap member 14 of the dipstick assembly 10 is inserted into an access passageway 48 of a sealed chamber generally indicated at 54 such that markings on the indicating blade 16 would show the fluid level within the sealed chamber 50. The contiguous passageways 26 and 18 would allow for venting of excess gases from within the sealed chamber 50. The annular sealing ring 30 would securely engage the cap member 14 within the access passageway 48 and also prevent loss of fluids from within the chamber 50. In the event that the fluid level within the chamber 50 is above the open end 40 of the cap member 14, excess gas pressure would be vented from the access passageway 48 via ports 34 and out through the contiguous passageways 26 and 18. Thusly, an auxiliary venting means is created preventing excess gas pressure buildup.

The invention has been described in an illustrative manner and it is to be understood that the terminology which has been used is intended to be in the nature of words of description rather than of limitation.

Obviously, many modifications and variations of the present invention are possible in light of the above teachings. It is, therefore to be understood that within the scope of the appended claims, the invention may be practiced otherwise than as specifically described.

The embodiments of the invention in which an exclusive property or privilege is claimed are defined as follows:

1. A dipstick assembly of the type used for measuring fluid levels within a sealed chamber wherein the dipstick assembly is adapted to be received in an access passageway to the chamber, said dipstick assembly comprising: a handle member having a passageway extending throughout as to allow communication therethrough, said handle member having a first straight portion, an elongated fluid level indicating member attached to and extending from said first straight portion of said handle member, a one piece cap member having an attachment end including an opening in a inwardly extending flange portion thereof, said handle member extending through said opening and being secured to said flange portion, the other end of said cap member being open, said cap member also having an outward flange head portion integral with said attachment end of said cap member for limiting the entrance of said dipstick assembly into the access passageway, said cap member including primary ventilation means comprising a longitudinally extending passageway for allowing the ventilation of gases from said open end through said cap member and into said handle member, sealing means provided on said cap member for perfecting a seal between said cap member and the interior of the access passageway of the sealed chamber when said dipstick assembly is inserted therein, said cap member also including an auxiliary venting means for allowing the ventilation of gases from the chamber through said handle member in the event that said open end of said cap member is below the fluid level within the sealed chamber.

2. An assembly as set forth in claim 1 wherein said sealing means is adjacent to said attachment end of said cap member and above said auxiliary venting means.

3. An assembly as set forth in claim 2 wherein said sealing means includes at least one recessed annular groove and an annular sealing ring disposed in said groove for sealingly engaging the access passageway.

4. An assembly as set forth in claim 3 wherein said auxiliary venting means includes a section of reduced diameter below said sealing means and above said open end of said cap member.

5. An assembly as set forth in claim 4 wherein said auxiliary venting means also includes a plurality of ports for allowing communication between said passageway of said cap member and said section of reduced diameter of said cap member.

6. A dipstick assembly of the type used for measuring fluid levels within a sealed chamber wherein the dipstick assembly would be received in an access passageway to the chamber, said dipstick assembly comprising: a handle member having a passageway extending throughout as to allow communication therethrough, said handle member having a first straight portion, an elongated fluid level indicating member attached to and extending from said first straight portion of said handle member, a cap member having an attachment end attached to said first straight portion of said handle member, an open end having a conical portion on the outer surface thereof and an outwardly extending flange head portion integral with said attachment end of said cap member for limiting the entrance of said dipstick assembly into the access passageway, said cap member including a passageway for allowing the ventilation of gases through said cap member and said handle member, said cap member supporting a sealing means for perfecting a seal between said cap member and the interior of the access passageway of the sealed chamber when said dipstick assembly is inserted therein, said sealing means including at least one recessed annular groove and an annular sealing ring disposed in said groove for sealingly engaging the access passageway and being positioned adjacent to said attachment end of said cap member, said cap member also including an auxiliary venting means for allowing the ventilation of gases from the chamber in the event that said open end of said cap member is below the fluid level within the sealed chamber, said auxiliary venting means including a section of reduced diameter below said sealing means and above said open end of said cap member and a plurality of ports for allowing communication between said passageway of said cap member and said section of reduced diameter of said cap member, said sealing means being positioned above said auxiliary venting means.

7. An assembly as set forth in claim 6 wherein said first straight portion of said handle member includes a radially outward extending projection, said cap member including an inwardly extending annular flange, said outward projection of said handle abutting one face of said annular flange, said first straight portion of said handle including a second outwardly flared flange abutting the other face of said annular flange thereby resulting in a mechanical attachment for securing said cap member to said handle member.

8. An assembly as set forth in claim 7 wherein said handle member includes a second straight portion as a route of escape of excess gases and an arcuate portion between said first and second straight portions, said fluid-level indicating member extending through said first straight and said arcuate portions as a means for connecting said fluid-level indicating member to said handle member.

* * * * *